(12) United States Patent
Mireault et al.

(10) Patent No.: US 12,078,819 B2
(45) Date of Patent: Sep. 3, 2024

(54) PERIMETER SHEET SPRING SUSPENSION ARRANGEMENT FOR CAMERA

(71) Applicant: Apple Inc., Cupertino, CA (US)

(72) Inventors: Alfred N. Mireault, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 18/167,780

(22) Filed: Feb. 10, 2023

(65) Prior Publication Data

US 2023/0185105 A1    Jun. 15, 2023

Related U.S. Application Data

(63) Continuation of application No. 17/023,991, filed on Sep. 17, 2020, now Pat. No. 11,579,461.

(60) Provisional application No. 62/906,037, filed on Sep. 25, 2019.

(51) Int. Cl.
| | |
|---|---|
| *G02B 27/64* | (2006.01) |
| *G02B 7/02* | (2021.01) |
| *G02B 7/10* | (2021.01) |
| *G02B 13/00* | (2006.01) |
| *H04N 23/68* | (2023.01) |

(52) U.S. Cl.
CPC .......... *G02B 27/646* (2013.01); *G02B 7/023* (2013.01); *G02B 7/102* (2013.01); *G02B 13/001* (2013.01); *H04N 23/685* (2023.01)

(58) Field of Classification Search
CPC ...... G02B 27/646; G02B 7/023; G02B 7/102; G02B 13/001; G02B 7/021; G02B 7/026; G02B 7/08; H04N 23/685; H04N 23/687; H04N 23/57
USPC ...................................................... 348/208.12
See application file for complete search history.

(56) References Cited

U.S. PATENT DOCUMENTS

| | | | |
|---|---|---|---|
| 9,609,219 B2 | 3/2017 | Howarth et al. | |
| 9,810,920 B2 | 11/2017 | Siegrist et al. | |
| 9,933,628 B2 | 4/2018 | Ariji | |
| 10,261,284 B2 | 4/2019 | Huang et al. | |
| 11,579,461 B1 | 2/2023 | Mireault et al. | |
| 2007/0257989 A1 | 11/2007 | Shirono | |
| 2007/0279497 A1 | 12/2007 | Wada et al. | |
| 2008/0031605 A1 | 2/2008 | Akada et al. | |
| 2010/0079604 A1 | 4/2010 | Washisu | |
| 2010/0328791 A1 | 12/2010 | Jung et al. | |
| 2011/0096178 A1 | 4/2011 | Ryu et al. | |
| 2012/0250156 A1 | 10/2012 | Asakawa et al. | |
| 2013/0039640 A1 | 2/2013 | Sekimoto | |
| 2018/0059381 A1* | 3/2018 | Sharma | G02B 7/08 |
| 2018/0316847 A1 | 11/2018 | Lau et al. | |

\* cited by examiner

*Primary Examiner* — Usman A Khan
(74) *Attorney, Agent, or Firm* — Robert C. Kowert; Kowert, Hood, Munyon, Rankin & Goetzel, P.C.

(57) ABSTRACT

Various embodiments include perimeter sheet spring suspension arrangements for cameras. A perimeter sheet spring suspension arrangement may be used to suspend a moveable platform of the camera from a base structure of the camera, and allow a lens group of the camera to move laterally. According to some embodiments, the perimeter sheet spring suspension arrangement may include one or more tabs that may be used as bumpers that cushion lateral movement of the moveable platform.

20 Claims, 7 Drawing Sheets

PERIMETER SHEET SPRING SUSPENSION ARRANGEMENT FOR CAMERA

This application is a continuation of U.S. patent application Ser. No. 17/023,991, filed Sep. 17, 2020, which claims benefit of priority to U.S. Provisional Application No. 62/906,037, filed Sep. 25, 2019, titled "Perimeter Sheet Spring Suspension Arrangement for Camera", which are hereby incorporated by reference in their entirety.

BACKGROUND

Technical Field

This disclosure relates generally to a perimeter sheet spring suspension arrangement for a camera.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

Figure 1:
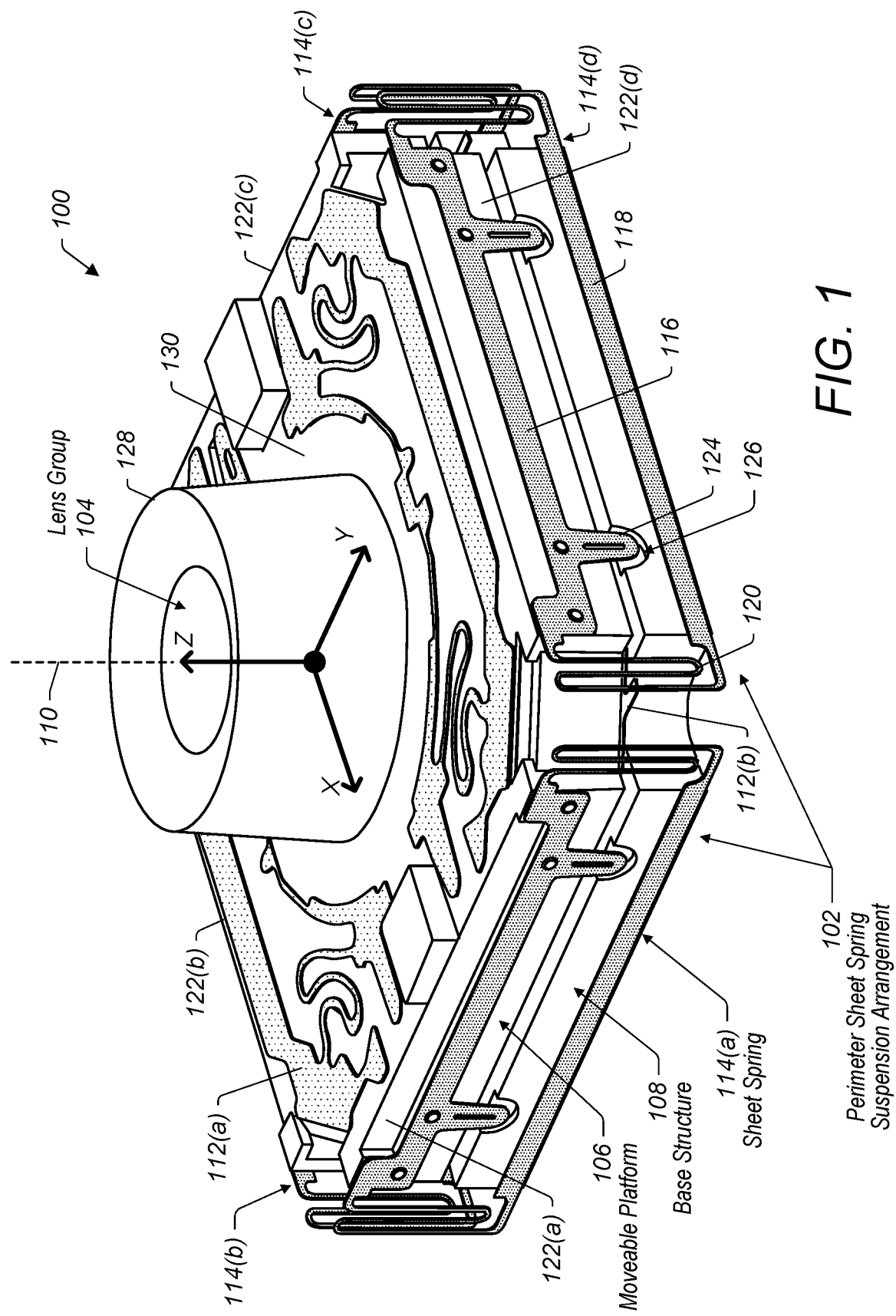
FIG. 1 illustrates a perspective view of an example camera that includes an example perimeter sheet spring suspension arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware-for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a perimeter sheet spring suspension arrangement for a camera. The perimeter sheet spring suspension arrangement may be used to suspend a moveable platform of the camera from a base structure of the camera. In various embodiments, the perimeter sheet spring suspension arrangement may allow a lens group of the camera to move laterally (e.g., in one or more directions orthogonal to an optical axis defined by the lens group). In some examples, the perimeter sheet spring suspension arrangement may include one or more sheet springs attached to one or more sides of the camera. For example, a sheet spring may include a first portion (e.g., an upper portion) attached to a side of a moveable platform of the camera, a second portion (e.g., a lower portion) attached to a side of a base structure of the camera, and/or one or more flexure arms. Each of the flexure arm(s) may connect the first portion to the second portion.

According to some embodiments, the perimeter sheet spring suspension arrangement may include one or more bumper spring tabs that cushion lateral movement of the moveable platform as the moveable platform approaches a stationary structure of the camera. The bumper spring tab(s) may prevent an undesirable collision between the moveable platform and the stationary structure (e.g., as a result of a drop event) that may damage the camera, negatively impact camera performance, and/or negatively impact user experience. In some instances, an undesirable "clicking" sound may be produced if the moveable platform collides with the stationary structure. The bumper spring tab(s) may provide acoustic mitigation to prevent or lessen such unwanted acoustics. In some examples, the bumper spring tab(s) and/or other portion(s) of the perimeter sheet spring suspension arrangement may be used to reduce or limit an amount of electrostatic charge accumulation on the moveable platform and/or the stationary structure.

Compared to some other camera systems that use different OIS suspension means (e.g., vertical suspension wires), some embodiments of the perimeter sheet spring suspension arrangement described herein may enabled a reduction in one or more dimensions of the system. For example, the perimeter sheet spring suspension arrangement may enable a height reduction by eliminating the need for solder points that are used in some other systems to attach suspension wires. Furthermore, compared to some other systems that use different OIS suspension means (e.g., vertical suspension wires), some embodiments of the perimeter sheet spring suspension arrangement described herein may enable improved modal performance (e.g., by driving up parasitic mode frequencies), more uniform and/or efficient stress distribution, and/or reduced stress, as discussed below.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include a perimeter sheet spring suspension arrangement having sheet springs attached to sides of a camera. FIG. 1 illustrates a perspective view of an example camera 100 that includes an example of such a perimeter sheet spring suspension arrangement 102. The example X-Y-Z coordinate system shown in FIG. 1 is used to discuss aspects of systems and/or system components, and may apply to embodiments described throughout this disclosure.

Figure 4:
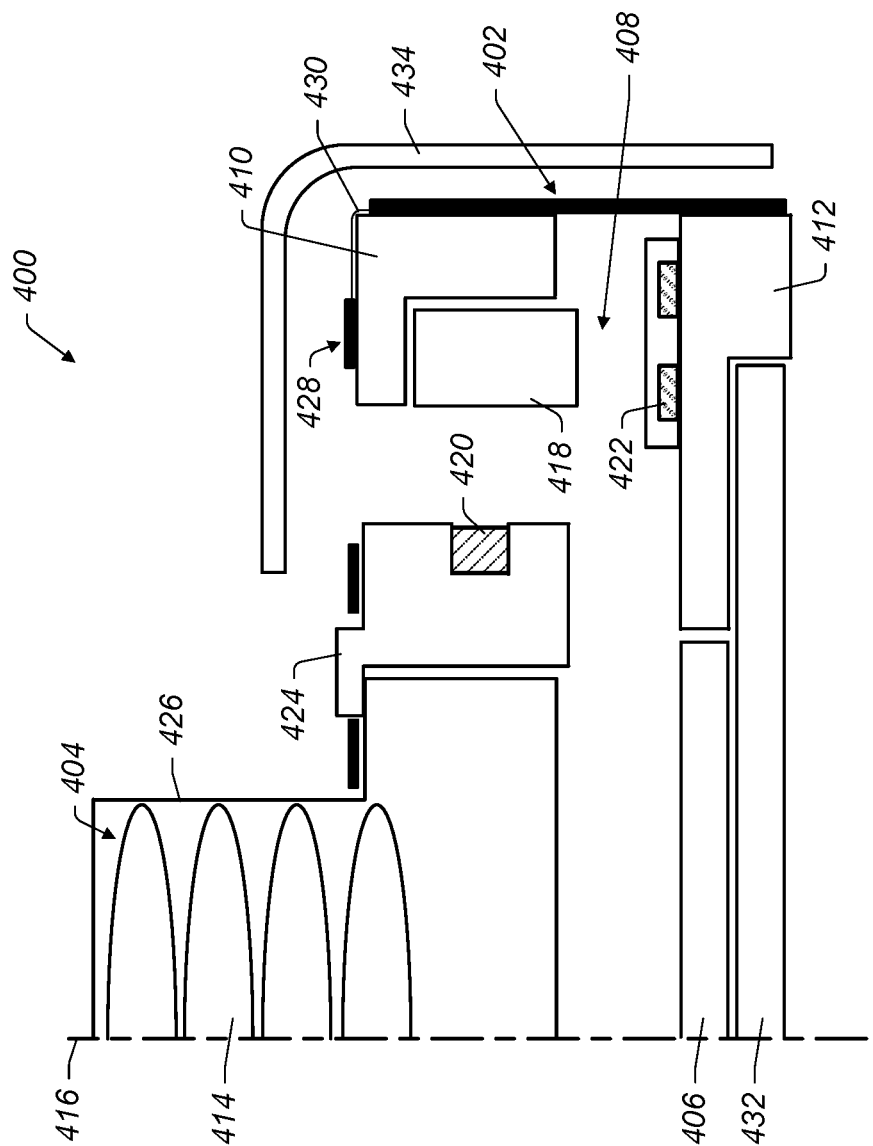
FIG. 4 illustrates a side cross-sectional view of an example camera that includes a perimeter sheet spring suspension arrangement, in accordance with some embodiments.

According to various embodiments, the camera 100 may include a lens group 104, an image sensor (e.g., image sensor 406 in FIG. 4), a moveable platform 106 (e.g., magnet holder 410 in FIG. 4), a base structure 108, the perimeter sheet spring suspension arrangement 102, and/or an actuator (e.g., actuator 408 in FIG. 4). The lens group 104 may include one or more lens elements that define an optical axis 110. In some embodiments, the lens group 104 may be coupled with the moveable platform 106. The image sensor may be configured to capture light that has passed through the lens group 104. In some embodiments, the image sensor may be coupled with the base structure 108.

In some embodiments, the actuator may be configured to move the lens group 104 and/or the image sensor, e.g., causing relative movement between the lens group 104 and the image sensor to provide autofocus (AF) and/or optical image stabilization (OIS) functionality. For example, the actuator may move the lens group 104 along the optical axis 110 to provide AF movement of an image on the image sensor. Additionally, or alternatively, the actuator may move the lens group 104 in one or more directions orthogonal to the optical axis 110 to provide OIS movement of an image on the image sensor. In some non-limiting examples, the actuator may comprise one or more voice coil motor (VCM) actuators, e.g., as further discussed herein with reference to FIG. 4.

According to various embodiments, the camera 100 may include one or more other suspension arrangements, e.g., in addition to the perimeter sheet spring suspension arrangement 102. For example, the camera 100 may include one or more upper leaf spring(s) (e.g., upper leaf spring 112(a), upper leaf spring 428 in FIG. 4, etc.) and/or lower leaf spring(s) (e.g., lower leaf spring 112(b)) that couple the lens group 104 to the moveable platform 106 (and/or that suspend the lens group 104 from the moveable platform 106). In some embodiments, the upper and/or lower leaf spring(s) may allow the lens group 104 to move, relative to the moveable platform 106, along the optical axis 110. For example, the upper and/or lower leaf spring(s) may provide sufficient compliance in the Z-axis direction to allow such movement along the optical axis 110, and/or provide sufficient stiffness in the X-Y plane to resist or prevent movement of the lens group 104, relative to the moveable platform 106, in one or more directions orthogonal to the optical axis 110. In some embodiments, the upper and/or lower leaf spring(s) may be considered AF springs (and/or an AF suspension arrangement) as the movement of the lens group 104 along the optical axis 110 that is allowed by the leaf spring(s) may enable controlled AF movement of an image on the image sensor.

In various embodiments, the perimeter sheet spring suspension arrangement 102 may include one or more sheet springs 114. The sheet spring(s) 114 may be disposed at one or more sides of the camera 100, e.g., along a perimeter of the moveable platform 106 and/or the base structure 108. The perimeter sheet spring suspension arrangement 102 may be configured to suspend the moveable platform 106 from the base structure 108 and allow the lens group 104 to move (e.g., together with the moveable platform 106) in one or more directions orthogonal to the optical axis 110. For example, the sheet spring(s) 114 may provide sufficient compliance in the X-Y plane to allow such movement in direction(s) orthogonal to the optical axis 110, and/or provide sufficient stiffness in the Z-axis direction to resist or prevent movement of the lens group 104 along the optical axis 110 in some examples. According to some embodiments, the sheet spring(s) 114 may be considered OIS spring(s) (and/or the perimeter sheet spring suspension arrangement 102 may be considered an OIS suspension arrangement) as the movement of the lens group 104 in one or more directions orthogonal to the optical axis 110 that is allowed by the sheet spring(s) 114 may enable controlled OIS movement of an image on the image sensor.

According to various embodiments, a sheet spring 114 may include a first portion 116 (e.g., an upper portion), a second portion 118 (e.g., a lower portion), and/or a set of one or more flexure arms 120, e.g., as indicated in FIG. 1. The first portion 116 may be attached to a side of the moveable platform 106. The second portion 118 may be attached to a side of the base structure 108. In various examples, the side of the base structure 108 (to which the second portion 118 is attached) may correspond to the side of the moveable platform 106 (to which the first portion 116 is attached), e.g., in the sense that they correspond to a same side of the camera 100. The flexure arm(s) 120 may connect the first portion 116 to the second portion 118.

In some non-limiting examples, the perimeter sheet spring suspension arrangement 102 may include a first sheet spring 114(a), a second sheet spring 114(b), a third sheet spring 114(c), and/or a fourth sheet spring 114(d), e.g., as indicated in FIG. 1. The first sheet spring 114(a) may include a first portion attached to a first side 122(a) of the moveable platform 106, a second portion attached to a first side of the base structure 108, and a first set of one or more flexure arms connecting the first portion of the first sheet spring 114(a) to the second portion of the first sheet spring 114(a). The second sheet spring 114(b) may include a first portion attached to a second side 122(b) of the moveable platform 106, a second portion attached to a second side of the base structure 108, and a second set of one or more flexure arms connecting the first portion of the second sheet spring 114(b) to the second portion of the second sheet spring 114(b). The third sheet spring 114(c) may include a first portion attached to a third side 122(c) of the moveable platform 106, a second portion attached to a third side of the base structure 108, and a third set of one or more flexure arms connecting the first portion of the third sheet spring 114(c) to the second portion of the third sheet spring 114(c). The third side of the moveable platform 106 may be opposite the first side of the moveable platform 106, and the third side of the base structure 108 may be opposite the first side of the base structure 108. The fourth sheet spring 114(d) may include a first portion attached to a fourth side 122(d) of the moveable platform 106, a second portion attached to a fourth side of the base structure 108, and a fourth set of one or more flexure arms connecting the first portion of the fourth sheet spring 114(d) to the second portion of the fourth sheet spring 114(d). The fourth side of the moveable platform 106 may be opposite the second side of the moveable platform 106, and the fourth side of the base structure 108 may be opposite the second side of the base structure 108. The perimeter sheet spring suspension arrangement 102 may include fewer or more sheet spring(s) 114 than indicated in FIG. 1 in some embodiments. Additionally, or alternatively, one or more of the sheet spring(s) 114 may be shaped and/or sized differently than indicated in FIG. 1 in some embodiments.

As indicated in FIG. 1, in some embodiments, the first set of flexure arm(s) of the first sheet spring 114(a) may include a first flexure arm proximate a first corner of the camera 100, and a second flexure arm proximate a second corner of the camera 100. The second set of flexure arm(s) of the second sheet spring 114(b) may include a first flexure arm proximate the second corner of the camera 100 (and/or proximate the second flexure arm of the first sheet spring 114(a)), and a second flexure arm proximate a third corner of the camera 100. The third set of flexure arm(s) of the third sheet spring 114(c) may include a first flexure arm proximate the third corner of the camera 100 (and/or proximate the second flexure arm of the second sheet spring 114(b)), and a second flexure arm proximate a fourth corner of the camera 100. The fourth set of flexure arm(s) of the fourth sheet spring 114(d) may include a first flexure arm proximate the fourth corner of the camera 100 (and/or proximate the second flexure arm of the third sheet spring 114(c)), and a second flexure arm proximate the first corner of the camera 100 (and/or proximate the first flexure arm of the first sheet spring 114(a)). The perimeter sheet spring suspension arrangement 102 may include fewer or more flexure arms than indicated in FIG. 1 in some embodiments. Additionally, or alternatively, a sheet spring 114 may have a different number of flexure arms than one or more other sheet springs 114 of the perimeter sheet spring suspension arrangement 102 in some embodiments. Additionally, or alternatively, one or more of the flexure arms may be located, shaped, and/or sized differently than indicated in FIG. 1 in some embodiments.

In various embodiments, a set of functional modes of the camera 100 may be characterized by patterns of motion exhibited by component(s) of the camera 100 (e.g., the lens group 104 and/or the moveable platform 106) at certain vibration frequencies (and/or frequency ranges). In some non-limiting examples, a first mode may be characterized by translation in the Z-axis direction at a first frequency range. A second mode may be characterized by translation in the X-axis direction at a second frequency range. A third mode may be characterized by translation in the Y-axis direction at a third frequency range. A fourth mode may be characterized by tilt about the Z-axis at a fourth frequency range. A fifth mode may be characterized by tilt about the X-axis at a fifth frequency range. A sixth mode may be characterized by tilt about the Y-axis at a sixth frequency range. As compared to some other systems that use different OIS suspension means (e.g., vertical suspension wires), some embodiments of the perimeter sheet spring suspension arrangement 102 described herein may enable improved modal performance (e.g., by driving up parasitic mode frequencies), more uniform and/or efficient stress distribution, and/or reduced stress.

In some cases, the frequency range for a mode may be the same as (or similar to) the frequency range for one or more other modes. As a non-limiting example, the second frequency range associated with the second mode (translation in the X-axis direction) may be the same as (or similar to) the third frequency range associated with the third mode (translation in the Y-axis direction). As another non-limiting example, the fourth frequency range associated with the fourth mode (tilt about the Z-axis) may be the same as (or similar to) the fifth frequency range associated with the fifth mode (tilt about the X-axis). In some cases, the frequency range for a mode may partially overlap with the frequency range for one or more other modes. As a non-limiting example, the second frequency range associated with the second mode (translation in the X-axis direction) and/or the third frequency range associated with the third mode (translation in the Y-axis direction) may partially overlap with the first frequency range associated with the first mode. As another non-limiting example, the fourth frequency ranger associated with the fourth mode (tilt about the Z-axis), the fifth frequency associated with the fifth mode (tilt about the X-axis), and/or the sixth frequency associated with the sixth mode (tilt about the Y-axis) may partially overlap with one another.

According to various embodiments, both in-plane and out-of-plane stiffnesses of the sheet spring(s) 114 of the perimeter sheet spring suspension arrangement 102 may be used (e.g., engaged so as to flex, deflect, and/or not be in a state of rest) in certain modes. For example, in side-to-side motion such as that exhibited in the second mode (translation in the X-axis direction) and the third mode (translation in the Y-axis direction), a first pair of opposing sheet springs 114 may be primarily engaged with respect to out-of-plane stiffness, while a second pair of opposing sheet springs 114 may be primarily engaged with respect to in-plane stiffness.

In a non-limiting example, the second mode (translation in the X-axis direction) may engage out-of-plane stiffness(es) of the flexure arms 120 of the first sheet spring 114(a) and the third sheet spring 114(c) (e.g., a first pair of opposing sheet springs), while engaging in-plane stiffness(es) of the flexure arms 120 of the second sheet spring 114(b) and the fourth sheet spring 114(d) (e.g., a second pair of opposing sheet springs). In this example, the in-plane stiffness may mitigate an extent to which the out-of-plane stiffness affects modal performance variability and/or stress variability, as dimensional variations in the sheet springs 114 may affect in-plane stiffness to a lesser extent than out-of-plane stiffness. For example, dimensional variations on flexure arms formed using an etching process may carry a linear effect on in-plane stiffness, whereas such dimensional variations may carry a cubic effect on out-plane-stiffness. While small variations in out-of-plane stiffness may correspond to large increases in modal performance variability and/or stress variability in some embodiments, engagement of the in-plane stiffness of one or more flexure arms (e.g., contemporaneously with engagement of the out-of-plane stiffness of one or more other flexure arms in certain modes) may mitigate such modal performance variability and/or stress variability.

According to some embodiments, one or more sheet springs 114 of the perimeter sheet spring suspension arrangement 102 may include one or more tabs 124 (also referred to herein as bumper spring tab(s) 124) that may be used as bumpers that cushion lateral movement of the moveable platform 106 as the moveable platform 106 approaches a stationary structure (e.g., shield can 434 in FIG. 4) of the camera 400. In some examples, the bumper spring tab(s) 124 may cushion lateral movement of the moveable platform 106 before the moveable platform 106 reaches a lateral end stop defined by the stationary structure.

The bumper spring tab(s) 124 may prevent an undesirable collision between the moveable platform 106 and the stationary structure (e.g., as a result of a drop event) that may damage the camera 100, negatively impact camera performance, and/or negatively impact user experience. In some instances, an undesirable "clicking" sound may be produced if the moveable platform 106 collides with the stationary structure. The bumper spring tab(s) 124 may provide acoustic mitigation to prevent or lessen such unwanted acoustics. Furthermore, in some examples, the bumper spring tab(s) and/or the sheet spring(s) 114 may be used to reduce or limit an amount of electrostatic charge accumulation on the moveable platform 106 and/or the stationary structure.

In some examples, the bumper spring tab(s) 124 may extend from the first portion(s) 116 of the sheet spring(s) 114, e.g., downwardly towards the second portion(s) 118 of the sheet spring(s) 114. At least a portion of the bumper spring tab(s) 124 may be configured to make contact with the base structure 108 when a lateral movement stroke of the moveable platform 106 satisfies (e.g., meets or exceeds) a stroke threshold. For example, at least a portion of the bumper spring tab(s) 124 may come into contact with the base structure 108 when the lateral movement stroke of the moveable platform 106 meets the stroke threshold, and at least a portion of the tab(s) 124 may deflect (e.g., in a lateral direction opposite the lateral movement of the moveable platform 106) when the lateral movement stroke exceeds the stroke threshold. In some embodiments, the base structure 108 may define one or more recesses 126 configured to receive one or more bumper spring tabs 124, e.g., as indicated in FIG. 1. For example, a bumper spring tab 124 may extend from a first portion 116 of a sheet spring 114 to at least partially within a corresponding recess 126. In some embodiments, the recess 126 may be sized and/or shaped such that engagement of the bumper spring tab 124 occurs in accordance with a desired lateral movement stroke and/or stroke threshold.

In some embodiments, the sheet spring(s) 114 may be monolithic sheet spring(s). For example, a sheet spring 114 may be formed of a same piece of material. In a non-limiting example, a sheet spring 114 may be formed by etching a sheet of metal. In this manner, the first portion 124, the second portion 126, the flexure arm(s) 120, and/or the bumper spring tab(s) 124 may be monolithic with respect to each other.

In some embodiments, the moveable platform 106 and/or the base structure 108 may define one or more features such as protrusions, tabs, ribs, recesses (e.g., recess 126), pockets, grooves, troughs, and the like, which may be designed to position the sheet spring(s) 114, e.g., along the X-axis (for sheet spring(s) 114 orthogonal to the X-axis) and/or the Y-axis (for sheet spring(s) 114 orthogonal to the Y-axis).

In some non-limiting examples, the first sheet spring 114(a) may define a first plane (e.g., parallel to the Y-Z plane). The second sheet spring 114(b) may define a second plane (e.g., parallel to the X-Z plane). The third sheet spring 114(c) may define a third plane (e.g., parallel to the Y-Z plane). The fourth sheet spring 114(d) may define a fourth plane (e.g., parallel to the X-Z plane). Additionally, or alternatively, the upper leaf spring 112(a) may define a fifth plane (e.g., parallel to the X-Y plane). Additionally, or alternatively, the lower leaf spring 112(b) may define a sixth plane (e.g., parallel to the X-Y plane). In some embodiments, each of the first plane (defined by the first sheet spring 114(a)), the second plane (defined by the second sheet spring 114(b)), the third plane (defined by the third sheet spring 114(c)), and/or the fourth plane (defined by the fourth sheet spring 114(*d*)) may be oriented at a respective non-zero angle relative to the fifth plane (defined by the upper leaf spring 112(*a*)) and/or the sixth plane (defined by the lower leaf spring 112(*b*)).

According to various embodiments, the camera 100 may include a lens barrel arrangement. The lens barrel arrangement may include a lens barrel 128 and/or a lens carrier 130. In some examples, the lens group 104 may be contained within the lens barrel 128, and the lens barrel 128 may be fixedly attached to the lens carrier 130 such that the lens group 104 is moveable together (e.g., in lockstep) with the lens carrier 130, e.g., via the actuator. As previously mentioned, the upper leaf spring(s) 112(*a*) and/or the lower leaf spring(s) 112(*b*) may suspend the lens group 104 from the moveable platform 106. In some embodiments, the upper leaf spring(s) 112(*a*) and/or the lower leaf spring(s) 112(*b*) may connect to the lens barrel arrangement. For example, as indicated in FIG. 1, the upper leaf spring 130 may connect to the lens carrier 130 and to the moveable platform 106. While the lens barrel 128 and the lens carrier 130 may be components that are individually formed and subsequently coupled to form the lens barrel arrangement, the lens barrel arrangement may be integrally formed (e.g., formed as a single component) in some embodiments. Furthermore, it should be appreciated that structural and/or functional aspects of the lens barrel 128 may additionally or alternatively be present in the lens carrier 130, and vice-versa.

Figure 2:
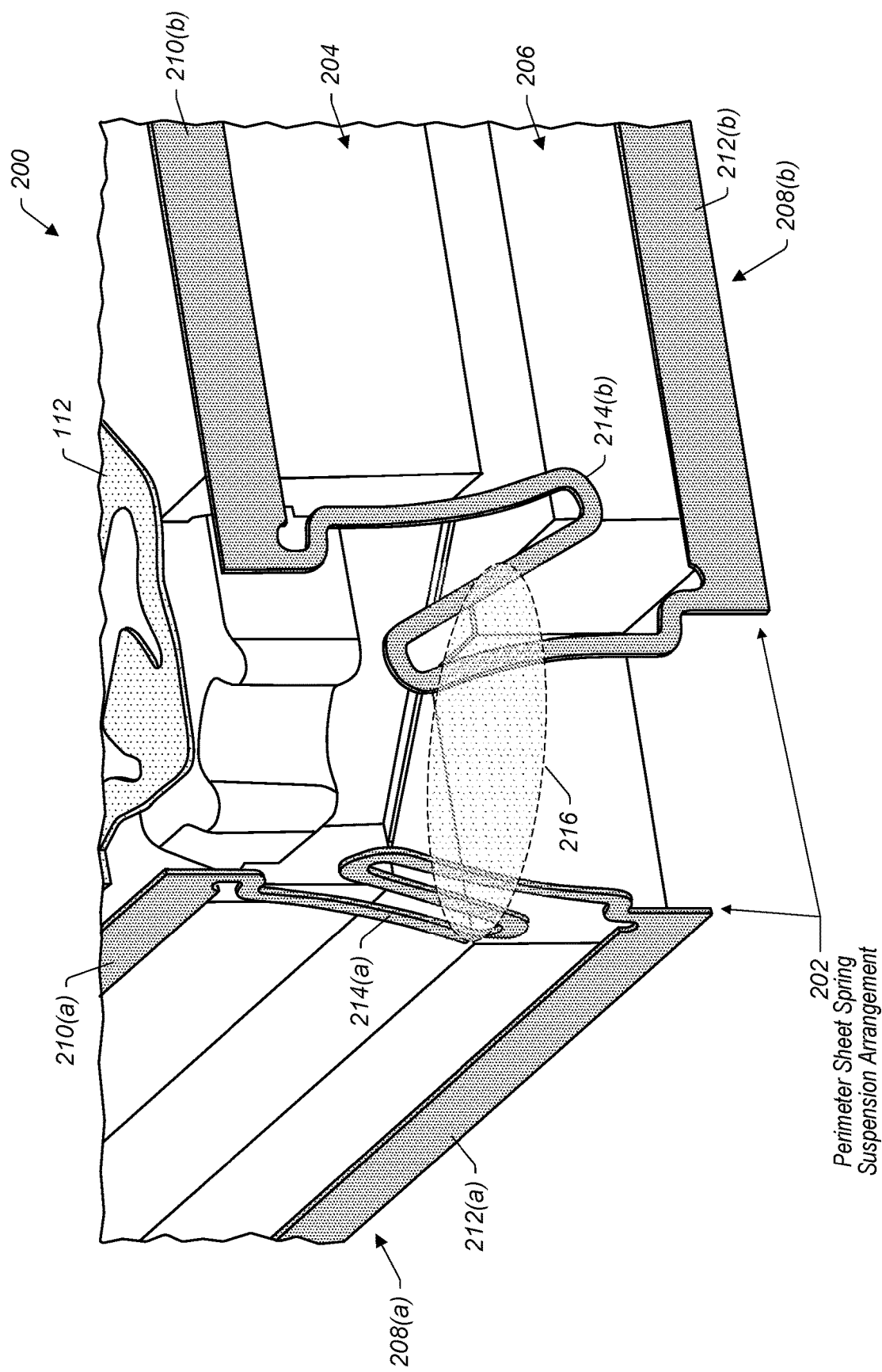
FIG. 2 illustrates an example of a portion of a perimeter sheet spring suspension arrangement in a deflected state, in accordance with some embodiments.

FIG. 2 illustrates an example 200 of a portion of a perimeter sheet spring suspension arrangement 202 in a deflected state, in accordance with some embodiments. In this example 200, the position of the moveable platform 204 is shown as being shifted, relative to the base structure 206. Furthermore, the flexure arms from different sheet springs are shown as being engaged and deflecting differently.

The perimeter sheet spring suspension arrangement 202 may include a first sheet spring 208(*a*) and a second sheet spring 208(*b*). The first sheet spring 208(*a*) may include a first portion 210(*a*), a second portion 212(*a*), and a first set of one or more flexure arms (e.g., including flexure arm 214(*a*)). The first portion 210(*a*) of the first sheet spring 208(*a*) may be attached to a first side of the moveable platform 204. The second portion 212(*a*) of the first sheet spring 208(*a*) may be attached to a first side of the base structure 206. The first flexure arm 214(*a*) may connect the first portion 210(*a*) of the first sheet spring 208(*a*) to the second portion 212(*a*) of the first sheet spring 208(*a*). The second sheet spring 208(*b*) may include a first portion 210(*b*), a second portion 212(*b*), and a second set of one or more flexure arms (e.g., including 214(*b*)). The first portion 210(*b*) of the second sheet spring 208(*b*) may be attached to a second side of the moveable platform 204. The second portion 212(*b*) of the second sheet spring 208(*b*) may be attached to a second side of the base structure 206. The second flexure arm 214(*b*) may connect the first portion 210(*b*) of the second sheet spring 208(*b*) to the second portion 212(*b*) of the second sheet spring 208(*b*).

According to some embodiments, the camera and/or the perimeter sheet spring suspension arrangement 202 may include a damper that dampens movement of one or more of the flexure arms 214. For instance, the first flexure arm 214(*a*) and/or the second flexure arm 214(*b*) may be at least partially disposed within a viscoelastic material 216 (e.g., a viscoelastic gel). In some examples, one or more structures (e.g., the moveable platform 204 and/or the base structure 206) may form one or more pockets within which the viscoelastic material 216 may be disposed. In some embodiments, the viscoelastic material 216 may be located along a central portion of the first flexure arm 214(*a*) and/or the second flexure arm 214(*b*). However, the viscoelastic material 216 may additionally, or alternatively, be located at any other suitable portion(s) of the first flexure arm 214(*a*) and/or the second flexure arm 214(*b*) in various embodiments.

Figure 3:
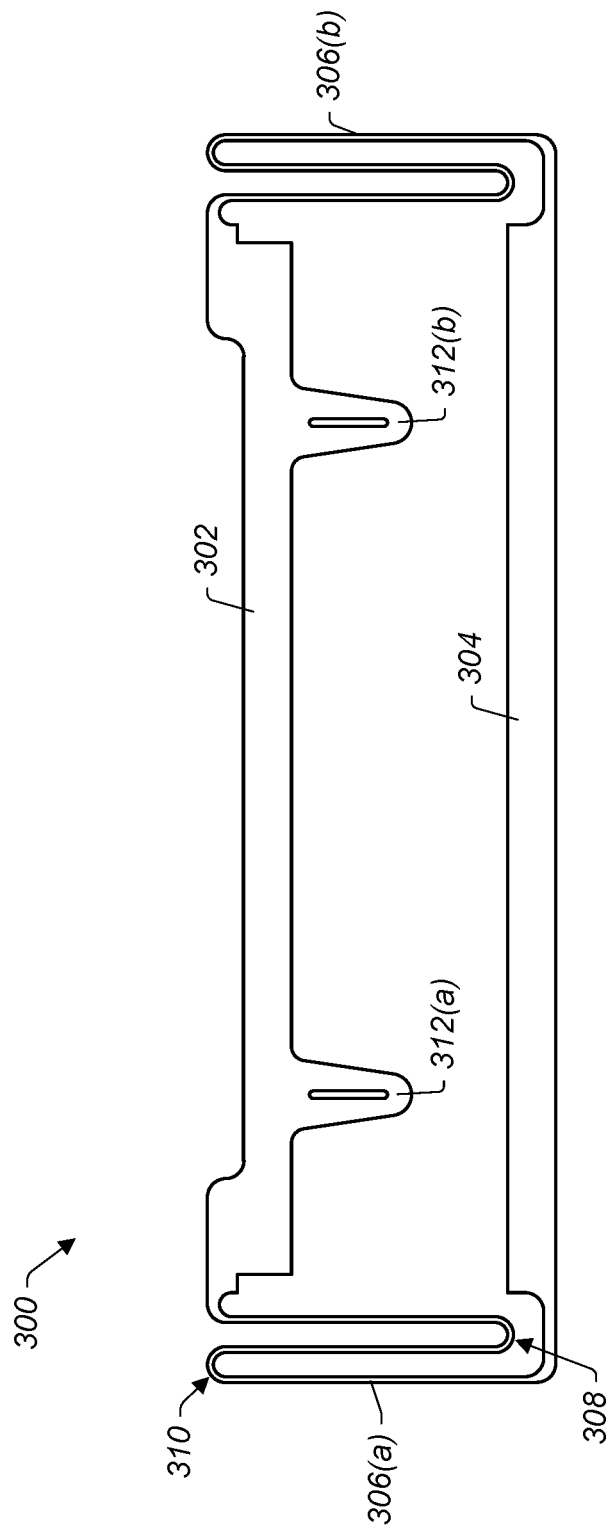
FIG. 3 illustrates a front view of an example sheet spring that may be used in a perimeter sheet spring suspension arrangement for a camera, in accordance with some embodiments.

FIG. 3 illustrates a front view of an example sheet spring 300 that may be used in a perimeter sheet spring suspension arrangement. In some embodiments, the perimeter sheet spring arrangement may be the same as (or similar to) the perimeter sheet spring arrangement 102 described herein with reference to FIG. 1, the perimeter sheet spring arrangement 202 described herein with reference to FIG. 2, and/or the perimeter sheet spring suspension arrangement 402 described with reference to FIG. 4. In some embodiments, the camera may be the same as (or similar to) the camera 100 described herein with reference to FIG. 1 and/or the camera 400 described herein with reference to FIG. 4.

According to some embodiments, the sheet spring 300 may include a first portion 302, a second portion 304, and a set of one or more flexure arms 306. For example, the set of flexure arms may include a first flexure arm 306(*a*) and a second flexure arm 306(*b*). However, the set of flexure arms 306 may include fewer or more flexure arms in various embodiments.

As indicated in FIG. 3, the set of flexure arms 306 may connect the first portion 302 to the second portion 304. In some embodiments, the first portion 302 may be considered an upper portion, and the second portion 304 may be considered a lower portion. The first portion 302 may be attached to a moveable platform (e.g., moveable platform 106 in FIG. 1, moveable platform 204 in FIG. 2, magnet holder 410 in FIG. 4, etc.). The second portion 304 may be attached to a base structure (e.g., base structure 108 in FIG. 1, base structure 206 in FIG. 2, base structure 412 in FIG. 4, etc.).

In some embodiments, the first portion 302 and/or the second portion 304 may have a respective longest dimension that extends in the same direction (e.g., the X-axis direction or the Y-axis direction). In a non-limiting example, the flexure arms 306(*a*) and 306(*b*) may be located at opposing end portions of the sheet spring 300 with respect to the longest dimension, e.g., as indicated in FIG. 3.

According to various embodiments, the flexure arm(s) 306 may comprise portion(s) of the sheet spring 300 that are thinner (e.g., along a plane defined by the sheet spring 300) than the first portion 302 and/or the second portion 304. In some embodiments, the flexure arm(s) 306 may include one or more bend portions. For example, the flexure arm 306(*a*) may include a first bend portion 308 and a second bend portion 310, as indicated in FIG. 3. However, in various embodiments individual ones of the flexure arm(s) 306 may include fewer or more bend portions than indicated in FIG. 3. In some embodiments, the flexure arm(s) 306 may include one or more segments that extend between the bend portion(s). The segment(s) may be vertically-oriented, e.g., as indicated in FIG. 3. In some embodiments, however, the flexure arm(s) 306 may include horizontally-oriented segment(s). Furthermore, the segment(s) may be parallel with one another, e.g., as indicated in FIG. 3. In some embodiments, however, the flexure arm(s) 306 may include segment(s) that are not parallel with one another.

As similarly discussed herein with reference to FIG. 1, in some embodiments the sheet spring 300 may include one or more bumper spring tabs 312 that may be used to cushion lateral movement of the moveable platform as the moveable platform approaches a stationary structure (e.g., shield can 434 in FIG. 4) of the camera. For example, the sheet spring 300 may include a first bumper spring tab 312(a) and a second bumper spring tab 312(b), as indicated in FIG. 3. The bumper spring tab(s) 312 may be located between the first flexure arm 306(a) and the second flexure arm 306(b) in some non-limiting embodiments.

FIG. 4 illustrates a side cross-sectional view of an example camera 400 that includes a perimeter sheet spring suspension arrangement 402, in accordance with some embodiments. In some embodiments, the camera 400 may be the same as (or similar to) the camera 100 described herein with reference to FIG. 1.

According to various embodiments, the camera 400 may include a lens group 404, an image sensor 406, an actuator 408, a moveable platform (e.g., magnet holder 410), and/or a base structure 412. The lens group 404 may include one or more lens elements 414 that define an optical axis 416. The image sensor 406 may be configured to capture light that passes through the lens group 404.

In some embodiments, the actuator 408 may be configured to move the lens group 404 and/or the image sensor 406, e.g., causing relative movement between the lens group 404 and the image sensor 406 to provide autofocus (AF) and/or optical image stabilization (OIS) functionality. For example, the actuator 408 may move the lens group 404 along the optical axis 416 to provide AF of an image on the image sensor 406. Additionally, or alternatively, the actuator 408 may move the lens group 404 in one or more directions orthogonal to the optical axis 416 to provide OIS of an image on the image sensor 406.

In some embodiments, the actuator 408 may comprise one or more voice coil motor (VCM) actuators. For example, the actuator 408 may include one or more magnets 418 and one or more coils (e.g., AF coil(s) 420 and/or OIS coil(s) 422). In some embodiments, the magnet(s) 418 may be attached to the magnet holder 410.

According to some non-limiting embodiments, the AF coil(s) 420 may be attached to a lens carrier 424 and/or a lens barrel 426. The lens carrier 424 may be coupled with the lens barrel 426 in some embodiments. In some embodiments, the lens barrel 426 may hold the lens element(s) 414 of the lens group 404. The AF coil(s) 420 may be disposed proximate the magnet(s) 418 such that the AF coil(s) 420 and the magnet(s) 418 magnetically interact when a current is provided to the AF coil(s) 420. In various embodiments, the magnetic interaction produces a Lorentz force that causes the lens group 404 (e.g., via the lens carrier 424 and/or the lens barrel 426) to move along the optical axis 416 to provide AF functionality.

According to some embodiments, the OIS coil(s) 422 may be coupled with the base structure 412. The OIS coil(s) 422 may be disposed proximate the magnet(s) 418 such that the OIS coil(s) and the magnet(s) 418 magnetically interact when a current is provided to the OIS coil(s) 422. In various embodiments, the magnetic interaction produces a Lorentz force that causes the lens group 404 (e.g., via the magnet holder 410, the lens carrier 424, and/or the lens barrel 426) to move in one or more directions orthogonal to the optical axis 416 to provide OIS functionality.

In various examples, the camera 400 may include one or more suspension arrangements like those described herein with reference to FIG. 1. For example, the camera 400 may include the perimeter sheet spring suspension arrangement 402 and/or one or more leaf springs 428 in some embodiments. In some embodiments, the leaf spring 428 may be the same as (or similar to) the upper leaf spring 112(a) described herein with reference to FIG. 1. In some embodiments, one or more sheet springs of the perimeter sheet spring suspension arrangement 402 may be electrically connected (e.g., via electrical connection 430) to one or more of the leaf springs 428. In this manner, electrical signals (e.g., power and/or control signals) may be conveyed between the perimeter sheet spring suspension arrangement 402 and the leaf spring(s) 428.

In some embodiments, the image sensor 406 may be coupled to the base structure 412. As a non-limiting example, the image sensor 406 may be attached to a substrate 432, and the substrate 432 may be attached to the base structure 412. In various embodiments, the image sensor 406, the substrate 432, and/or the base structure 412 may be stationary relative to movement of the lens group 404, the lens barrel 426, the lens carrier 424, and/or the magnet holder 410. Additionally, or alternatively, a stationary structure such as a shield can 434 may encase at least a portion of the camera 400. As similarly discussed herein with reference to FIGS. 1 and 3, in some embodiments the perimeter sheet spring suspension arrangement 412 may include one or more bumper spring tabs that cushion lateral movement of the magnet holder 410 before the magnet holder 410 reaches a lateral end stop defined by the shield can 434.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 5:
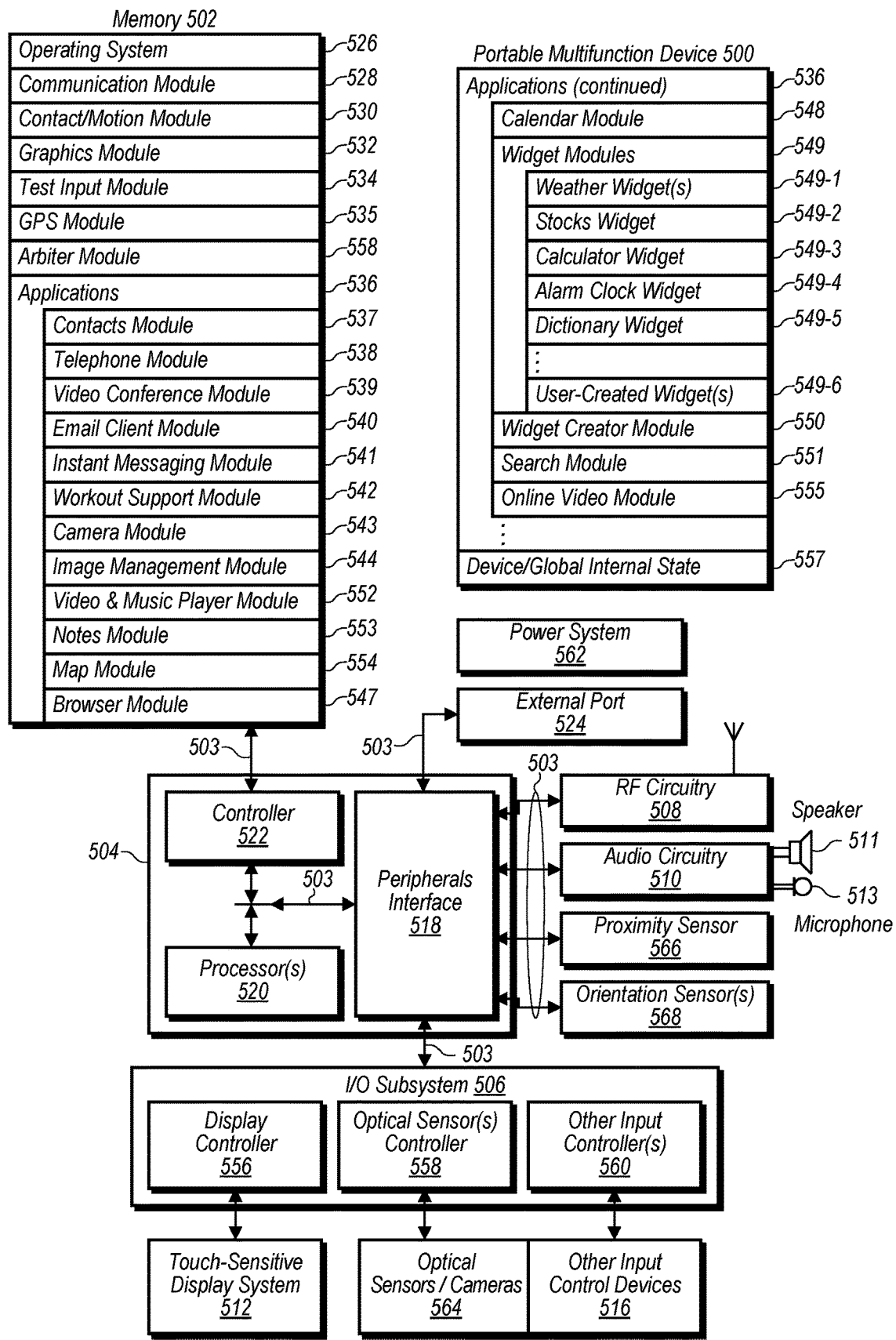
FIG. 5 illustrates a block diagram of a portable multifunction device that may include a perimeter sheet spring suspension arrangement for a camera, in accordance with some embodiments.

Attention is now directed toward embodiments of portable devices with cameras. FIG. 5 illustrates a block diagram of an example portable multifunction device 500 that may include a perimeter sheet spring suspension arrangement for a camera (e.g., the camera(s) and/or the perimeter sheet spring suspension arrangement(s) described above with reference to FIGS. 1-4), according to some embodiments. Cameras 564 are sometimes called "optical sensors" for convenience, and may also be known as or called an optical sensor system. Device 500 may include memory 502 (which may include one or more computer readable storage mediums), memory controller 522, one or more processing units (CPUs) 520, peripherals interface 518, RF circuitry 508, audio circuitry 510, speaker 511, touch-sensitive display system 512, microphone 513, input/output (I/O) subsystem 506, other input or control devices 516, and external port 524. Device 500 may include multiple optical sensors 564. These components may communicate over one or more communication buses or signal lines 503.

It should be appreciated that device 500 is only one example of a portable multifunction device, and that device 500 may have more or fewer components than shown, may combine two or more components, or may have a different configuration or arrangement of the components. The various components shown in FIG. 5 may be implemented in hardware, software, or a combination of hardware and software, including one or more signal processing and/or application specific integrated circuits.

Memory 502 may include high-speed random access memory and may also include non-volatile memory, such as one or more magnetic disk storage devices, flash memory devices, or other non-volatile solid-state memory devices. Access to memory 502 by other components of device 500, such as CPU 520 and the peripherals interface 518, may be controlled by memory controller 522.

Peripherals interface 518 can be used to couple input and output peripherals of the device to CPU 520 and memory 502. The one or more processors 520 run or execute various software programs and/or sets of instructions stored in memory 502 to perform various functions for device 500 and to process data.

In some embodiments, peripherals interface 518, CPU 520, and memory controller 522 may be implemented on a single chip, such as chip 504. In some other embodiments, they may be implemented on separate chips.

RF (radio frequency) circuitry 508 receives and sends RF signals, also called electromagnetic signals. RF circuitry 508 converts electrical signals to/from electromagnetic signals and communicates with communications networks and other communications devices via the electromagnetic signals. RF circuitry 508 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 508 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 510, speaker 511, and microphone 513 provide an audio interface between a user and device 500. Audio circuitry 510 receives audio data from peripherals interface 518, converts the audio data to an electrical signal, and transmits the electrical signal to speaker 511. Speaker 511 converts the electrical signal to human-audible sound waves. Audio circuitry 510 also receives electrical signals converted by microphone 513 from sound waves. Audio circuitry 510 converts the electrical signal to audio data and transmits the audio data to peripherals interface 518 for processing. Audio data may be retrieved from and/or transmitted to memory 502 and/or RF circuitry 508 by peripherals interface 518. In some embodiments, audio circuitry 510 also includes a headset jack (e.g., 612, FIG. 6). The headset jack provides an interface between audio circuitry 510 and removable audio input/output peripherals, such as output-only headphones or a headset with both output (e.g., a headphone for one or both ears) and input (e.g., a microphone).

I/O subsystem 506 couples input/output peripherals on device 500, such as touch screen 512 and other input control devices 516, to peripherals interface 518. I/O subsystem 506 may include display controller 556 and one or more input controllers 560 for other input or control devices. The one or more input controllers 560 receive/send electrical signals from/to other input or control devices 516. The other input control devices 516 may include physical buttons (e.g., push buttons, rocker buttons, etc.), dials, slider switches, joysticks, click wheels, and so forth. In some alternate embodiments, input controller(s) 560 may be coupled to any (or none) of the following: a keyboard, infrared port, USB port, and a pointer device such as a mouse. The one or more buttons (e.g., 608, FIG. 6) may include an up/down button for volume control of speaker 511 and/or microphone 513. The one or more buttons may include a push button (e.g., 606, FIG. 6).

Touch-sensitive display 512 provides an input interface and an output interface between the device and a user. Display controller 556 receives and/or sends electrical signals from/to touch screen 512. Touch screen 512 displays visual output to the user. The visual output may include graphics, text, icons, video, and any combination thereof (collectively termed "graphics"). In some embodiments, some or all of the visual output may correspond to user-interface objects.

Touch screen 512 has a touch-sensitive surface, sensor or set of sensors that accepts input from the user based on haptic and/or tactile contact. Touch screen 512 and display controller 556 (along with any associated modules and/or sets of instructions in memory 502) detect contact (and any movement or breaking of the contact) on touch screen 512 and converts the detected contact into interaction with user-interface objects (e.g., one or more soft keys, icons, web pages or images) that are displayed on touch screen 512. In an example embodiment, a point of contact between touch screen 512 and the user corresponds to a finger of the user.

Touch screen 512 may use LCD (liquid crystal display) technology, LPD (light emitting polymer display) technology, or LED (light emitting diode) technology, although other display technologies may be used in other embodiments. Touch screen 512 and display controller 556 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 512. In an example embodiment, projected mutual capacitance sensing technology is used, such as that found in the iPhone®, iPod Touch®, and iPad® from Apple Inc. of Cupertino, California.

Touch screen 512 may have a video resolution in excess of 800 dpi. In some embodiments, the touch screen has a video resolution of approximately 860 dpi. The user may make contact with touch screen 512 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 500 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 512 or an extension of the touch-sensitive surface formed by the touch screen.

Device 500 also includes power system 562 for powering the various components. Power system 562 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 500 may also include one or more optical sensors or cameras 564. FIG. 5 shows an optical sensor 564 coupled to optical sensor controller 558 in I/O subsystem 506. Optical sensor 564 may include charge-coupled device (CCD) or complementary metal-oxide semiconductor (CMOS) phototransistors. Optical sensor 564 receives light from the environment, projected through one or more lens, and converts the light to data representing an image. In conjunction with imaging module 543 (also called a camera module), optical sensor 564 may capture still images or video. In some embodiments, an optical sensor 564 is located on the back of device 500, opposite touch screen display 512 on the front of the device, so that the touch screen display 512 may be used as a viewfinder for still and/or video image acquisition. In some embodiments, another optical sensor is located on the front of the device so that the user's image may be obtained for videoconferencing while the user views the other video conference participants on the touch screen display.

Device 500 may also include one or more proximity sensors 566. FIG. 5 shows proximity sensor 566 coupled to peripherals interface 518. Alternately, proximity sensor 566 may be coupled to input controller 560 in I/O subsystem 506. In some embodiments, the proximity sensor 566 turns off and disables touch screen 512 when the multifunction device 500 is placed near the user's ear (e.g., when the user is making a phone call).

Device 500 includes one or more orientation sensors 568. In some embodiments, the one or more orientation sensors 568 include one or more accelerometers (e.g., one or more linear accelerometers and/or one or more rotational accelerometers). In some embodiments, the one or more orientation sensors 568 include one or more gyroscopes. In some embodiments, the one or more orientation sensors 568 include one or more magnetometers. In some embodiments, the one or more orientation sensors 568 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 500. In some embodiments, the one or more orientation sensors 568 include any combination of orientation/rotation sensors. FIG. 5 shows the one or more orientation sensors 568 coupled to peripherals interface 518. Alternately, the one or more orientation sensors 568 may be coupled to an input controller 560 in I/O subsystem 506. In some embodiments, information is displayed on the touch screen display 512 in a portrait view or a landscape view based on an analysis of data received from the one or more orientation sensors 568.

In some embodiments, the software components stored in memory 502 include operating system 526, communication module (or set of instructions) 528, contact/motion module (or set of instructions) 530, graphics module (or set of instructions) 532, text input module (or set of instructions) 534, Global Positioning System (GPS) module (or set of instructions) 535, arbiter module 558 and applications (or sets of instructions) 536. Furthermore, in some embodiments memory 502 stores device/global internal state 557. Device/global internal state 557 includes one or more of: active application state, indicating which applications, if any, are currently active; display state, indicating what applications, views or other information occupy various regions of touch screen display 512; sensor state, including information obtained from the device's various sensors and input control devices 516; and location information concerning the device's location and/or attitude.

Operating system 526 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 528 facilitates communication with other devices over one or more external ports 524 and also includes various software components for handling data received by RF circuitry 508 and/or external port 524. External port 524 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 530 may detect contact with touch screen 512 (in conjunction with display controller 556) and other touch sensitive devices (e.g., a touchpad or physical click wheel). Contact/motion module 530 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 530 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 530 and display controller 556 detect contact on a touchpad.

Contact/motion module 530 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 532 includes various known software components for rendering and displaying graphics on touch screen 512 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 532 stores data representing graphics to be used. Each graphic may be assigned a corresponding code. Graphics module 532 receives, from applications etc., one or more codes specifying graphics to be displayed along with, if necessary, coordinate data and other graphic property data, and then generates screen image data to output to display controller 556.

Text input module 534, which may be a component of graphics module 532, provides soft keyboards for entering text in various applications (e.g., contacts 537, e-mail 540, IM 541, browser 547, and any other application that needs text input).

GPS module 535 determines the location of the device and provides this information for use in various applications (e.g., to telephone 538 for use in location-based dialing, to camera 543 as picture/video metadata, and to applications that provide location-based services such as weather widgets, local yellow page widgets, and map/navigation widgets).

Applications 536 may include the following modules (or sets of instructions), or a subset or superset thereof:
 contacts module 537 (sometimes called an address book or contact list);
 telephone module 538;
 video conferencing module 539;
 e-mail client module 540;
 instant messaging (IM) module 541;
 workout support module 542;
 camera module 543 for still and/or video images;
 image management module 544;
 browser module 547;
 calendar module 548;
 widget modules 549, which may include one or more of: weather widget 549-1, stocks widget 549-2, calculator widget 549-3, alarm clock widget 549-4, dictionary widget 549-5, and other widgets obtained by the user, as well as user-created widgets 549-6;
 widget creator module 550 for making user-created widgets 549-6;
 search module 551;
 video and music player module 552, which may be made up of a video player module and a music player module;
 notes module 553;
 map module 554; and/or
 online video module 555.

Examples of other applications 536 that may be stored in memory 502 include other word processing applications, other image editing applications, drawing applications, presentation applications, JAVA-enabled applications, encryption, digital rights management, voice recognition, and voice replication.

In conjunction with touch screen 512, display controller 556, contact module 530, graphics module 532, and text input module 534, contacts module 537 may be used to manage an address book or contact list (e.g., stored in application internal state 557), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 538, video conference 539, e-mail 540, or IM 541; and so forth.

In conjunction with RF circuitry 508, audio circuitry 510, speaker 511, microphone 513, touch screen 512, display controller 556, contact module 530, graphics module 532, and text input module 534, telephone module 538 may be used to enter a sequence of characters corresponding to a telephone number, access one or more telephone numbers in address book 537, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 508, audio circuitry 510, speaker 511, microphone 513, touch screen 512, display controller 556, optical sensor 564, optical sensor controller 558, contact module 530, graphics module 532, text input module 534, contact list 537, and telephone module 538, videoconferencing module 539 includes executable instructions to initiate, conduct, and terminate a video conference between a user and one or more other participants in accordance with user instructions.

In conjunction with RF circuitry 508, touch screen 512, display controller 556, contact module 530, graphics module 532, and text input module 534, e-mail client module 540 includes executable instructions to create, send, receive, and manage e-mail in response to user instructions. In conjunction with image management module 544, e-mail client module 540 makes it very easy to create and send e-mails with still or video images taken with camera module 543.

In conjunction with RF circuitry 508, touch screen 512, display controller 556, contact module 530, graphics module 532, and text input module 534, the instant messaging module 541 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 508, touch screen 512, display controller 556, contact module 530, graphics module 532, text input module 534, GPS module 535, map module 554, and music player module 546, workout support module 542 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 512, display controller 556, optical sensor(s) 564, optical sensor controller 558, contact module 530, graphics module 532, and image management module 544, camera module 543 includes executable instructions to capture still images or video (including a video stream) and store them into memory 502, modify characteristics of a still image or video, or delete a still image or video from memory 502.

In conjunction with touch screen 512, display controller 556, contact module 530, graphics module 532, text input module 534, and camera module 543, image management module 544 includes executable instructions to arrange, modify (e.g., edit), or otherwise manipulate, label, delete, present (e.g., in a digital slide show or album), and store still and/or video images.

In conjunction with RF circuitry 508, touch screen 512, display system controller 556, contact module 530, graphics module 532, and text input module 534, browser module 547 includes executable instructions to browse the Internet in accordance with user instructions, including searching, linking to, receiving, and displaying web pages or portions thereof, as well as attachments and other files linked to web pages.

In conjunction with RF circuitry 508, touch screen 512, display system controller 556, contact module 530, graphics module 532, text input module 534, e-mail client module 540, and browser module 547, calendar module 548 includes executable instructions to create, display, modify, and store calendars and data associated with calendars (e.g., calendar entries, to do lists, etc.) in accordance with user instructions.

In conjunction with RF circuitry 508, touch screen 512, display system controller 556, contact module 530, graphics module 532, text input module 534, and browser module 547, widget modules 549 are mini-applications that may be downloaded and used by a user (e.g., weather widget 549-1, stocks widget 549-2, calculator widget 549-3, alarm clock widget 549-4, and dictionary widget 549-5) or created by the user (e.g., user-created widget 549-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 508, touch screen 512, display system controller 556, contact module 530, graphics module 532, text input module 534, and browser module 547, the widget creator module 550 may be used by a user to create widgets (e.g., turning a user-specified portion of a web page into a widget).

In conjunction with touch screen 512, display system controller 556, contact module 530, graphics module 532, and text input module 534, search module 551 includes executable instructions to search for text, music, sound, image, video, and/or other files in memory 502 that match one or more search criteria (e.g., one or more user-specified search terms) in accordance with user instructions.

In conjunction with touch screen 512, display system controller 556, contact module 530, graphics module 532, audio circuitry 510, speaker 511, RF circuitry 508, and browser module 547, video and music player module 552 includes executable instructions that allow the user to download and play back recorded music and other sound files stored in one or more file formats, such as MP3 or AAC files, and executable instructions to display, present or otherwise play back videos (e.g., on touch screen 512 or on an external, connected display via external port 524). In some embodiments, device 500 may include the functionality of an MP3 player.

In conjunction with touch screen 512, display controller 556, contact module 530, graphics module 532, and text input module 534, notes module 553 includes executable instructions to create and manage notes, to do lists, and the like in accordance with user instructions.

In conjunction with RF circuitry 508, touch screen 512, display system controller 556, contact module 530, graphics module 532, text input module 534, GPS module 535, and browser module 547, map module 554 may be used to receive, display, modify, and store maps and data associated with maps (e.g., driving directions; data on stores and other points of interest at or near a particular location; and other location-based data) in accordance with user instructions.

In conjunction with touch screen 512, display system controller 556, contact module 530, graphics module 532, audio circuitry 510, speaker 511, RF circuitry 508, text input module 534, e-mail client module 540, and browser module 547, online video module 555 includes instructions that allow the user to access, browse, receive (e.g., by streaming and/or download), play back (e.g., on the touch screen or on an external, connected display via external port 524), send an e-mail with a link to a particular online video, and otherwise manage online videos in one or more file formats, such as H.264. In some embodiments, instant messaging module 541, rather than e-mail client module 540, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 502 may store a subset of the modules and data structures identified above. Furthermore, memory 502 may store additional modules and data structures not described above.

In some embodiments, device 500 is a device where operation of a predefined set of functions on the device is performed exclusively through a touch screen and/or a touchpad. By using a touch screen and/or a touchpad as the primary input control device for operation of device 500, the number of physical input control devices (such as push buttons, dials, and the like) on device 500 may be reduced.

The predefined set of functions that may be performed exclusively through a touch screen and/or a touchpad include navigation between user interfaces. In some embodiments, the touchpad, when touched by the user, navigates device 500 to a main, home, or root menu from any user interface that may be displayed on device 500. In such embodiments, the touchpad may be referred to as a "menu button." In some other embodiments, the menu button may be a physical push button or other physical input control device instead of a touchpad.

Figure 6:
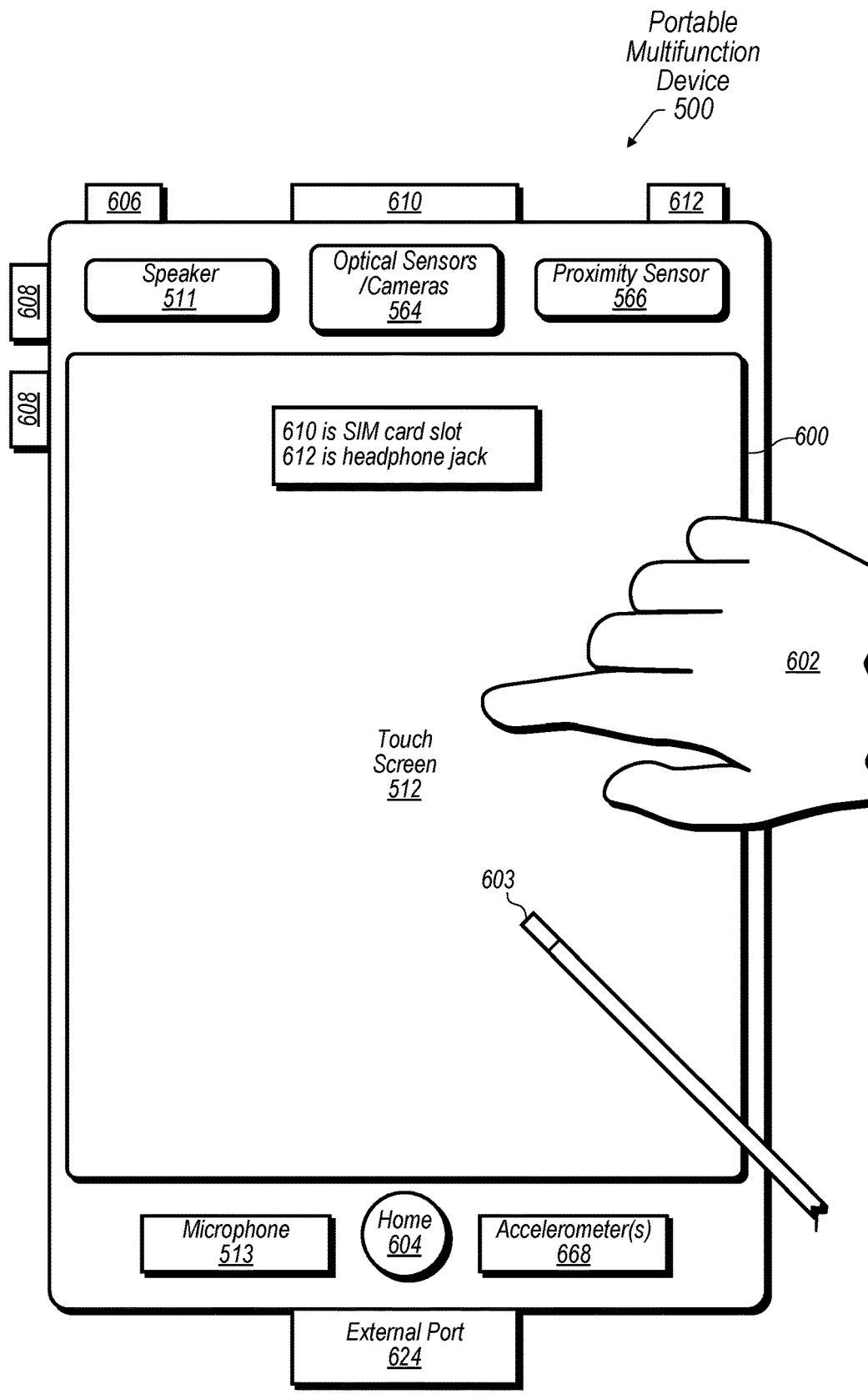
FIG. 6 illustrates a portable multifunction device that may include a perimeter sheet spring suspension arrangement for a camera, in accordance with some embodiments.

FIG. 6 depicts illustrates an example portable multifunction device 500 that may include a perimeter sheet spring suspension arrangement for a camera (e.g., the camera(s) and/or the perimeter sheet spring suspension arrangement(s) described above with reference to FIGS. 1-4), according to some embodiments. The device 500 may have a touch screen 512. The touch screen 512 may display one or more graphics within user interface (UI) 600. In this embodiment, as well as others described below, a user may select one or more of the graphics by making a gesture on the graphics, for example, with one or more fingers 602 (not drawn to scale in the figure) or one or more styluses 603 (not drawn to scale in the figure).

Device 500 may also include one or more physical buttons, such as "home" or menu button 604. As described previously, menu button 604 may be used to navigate to any application 536 in a set of applications that may be executed on device 500. Alternatively, in some embodiments, the menu button 604 is implemented as a soft key in a GUI displayed on touch screen 512.

In one embodiment, device 500 includes touch screen 512, menu button 604, push button 606 for powering the device on/off and locking the device, volume adjustment button(s) 608, Subscriber Identity Module (SIM) card slot 610, head set jack 612, and docking/charging external port 624. Push button 606 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 500 also may accept verbal input for activation or deactivation of some functions through microphone 513.

It should be noted that, although many of the examples herein are given with reference to optical sensor(s)/camera(s) 564 (on the front of a device), one or more rear-facing cameras or optical sensors that are pointed opposite from the display may be used instead of, or in addition to, an optical sensor(s)/camera(s) 564 on the front of a device.

Example Computer System

Figure 7:
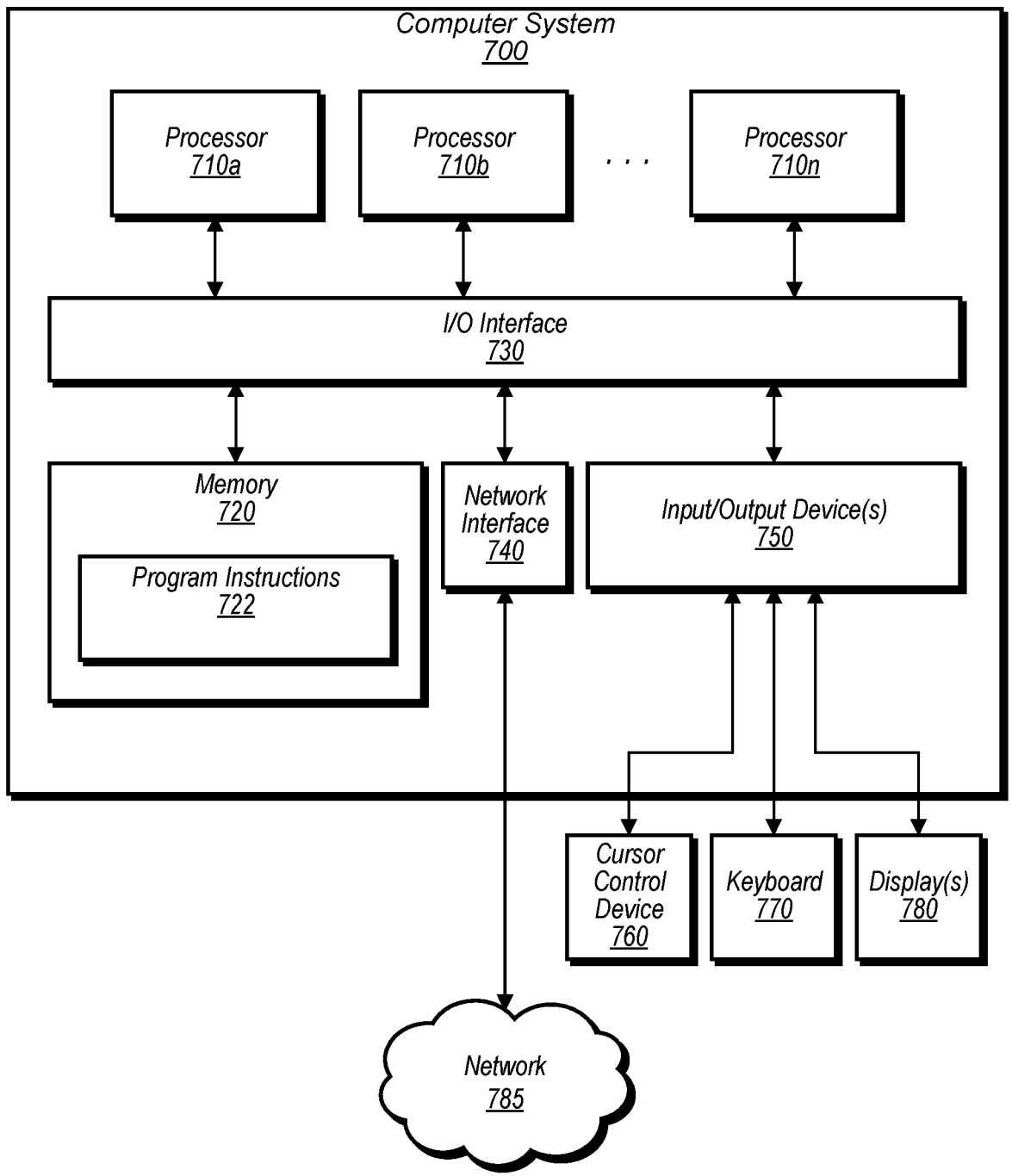
FIG. 7 illustrates an example computer system that may include a perimeter sheet spring suspension arrangement for a camera, in accordance with some embodiments.

FIG. 7 illustrates an example computer system 700 that may include a perimeter sheet spring suspension arrangement for a camera (e.g., the camera(s) and/or the perimeter sheet spring suspension arrangement(s) described above with reference to FIGS. 1-4), according to some embodiments. The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 700, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the ×86, PowerPC, SPARC, or MIPS ISAs, or any other suitable ISA. In multiprocessor systems, each of processors 710 may commonly, but not necessarily, implement the same ISA.

System memory 720 may be configured to store camera control program instructions 722 and/or camera control data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement a lens control application 724 incorporating any of the functionality described above.

Additionally, existing camera control data 732 of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A camera, comprising: a lens group comprising one or more lens elements that define an optical axis; an image sensor to capture light that has passed through the lens group; a base structure coupled with the image sensor; a moveable platform coupled with the lens group; an actuator to move lens group together with the moveable platform in one or more directions orthogonal to the optical axis; and a suspension arrangement comprising a plurality of sheet springs that suspend the moveable platform from the base structure and allow the lens group to move in the one or more directions orthogonal to the optical axis.

Clause 2: The camera of Clause 1, wherein individual ones of the plurality of sheet springs comprise: a respective first portion attached to the moveable platform; a respective second portion attached to the base structure; and a respective set of one or more flexure arms connecting the respective first portion to the respective second portion.

Clause 3: The camera of Clause 2, wherein: the base structure defines a recess; individual ones of the plurality of sheet springs further comprise: a bumper spring tab extending from the respective first portion to at least partially within the recess, wherein the bumper spring tab is configured to cushion lateral movement of the moveable platform as the moveable platform approaches a stationary structure of the camera.

Clause 4: The camera of Clause 3, wherein the stationary structure comprises: a shield can that encases at least a portion of the camera.

Clause 5: The camera of any of Clauses 1-3, wherein: the moveable platform comprises a magnet holder; and the actuator comprises one or more magnets attached to the magnet holder.

Clause 6: The camera of any of Clauses 1-5, wherein the plurality of sheet springs comprises: a first sheet spring extending along a first plane, comprising: a first portion attached to a first side of the moveable platform; a second portion attached to a first side of the base structure; and a first set of one or more flexure arms connecting the first portion of the first sheet spring to the second portion of the first sheet spring; and a second sheet spring extending along a second plane that is orthogonal to the first plane, comprising: a first portion attached to a second side of the moveable platform; a second portion attached to a second side of the base structure; and a second set of one or more flexure arms connecting the first portion of the second sheet spring to the second portion of the second sheet spring.

Clause 7: The camera of any of Clauses 1-6, wherein: the suspension arrangement comprises an optical image stabilization (OIS) suspension arrangement; individual ones of the plurality of sheet springs extend along a respective plane that is parallel to the optical axis; and the camera further comprises: an autofocus (AF) suspension arrangement, comprising: a leaf spring coupling the lens group to the moveable platform and allowing the lens group to move, relative to the moveable platform, along the optical axis; wherein the leaf spring extends along a plane that is orthogonal to the optical axis.

Clause 8: A device, comprising: one or more processors; memory storing program instructions executable by the one or more processors to control operation of a camera; and the camera, comprising: a lens group comprising one or more lens elements that define an optical axis; an image sensor to capture light that has passed through the lens group; a base structure coupled with the image sensor; a moveable platform coupled with the lens group; an actuator to move lens group together with the moveable platform in one or more directions orthogonal to the optical axis; and a suspension arrangement comprising a plurality of sheet springs that suspend the moveable platform from the base structure and allow the lens group to move in the one or more directions orthogonal to the optical axis.

Clause 9: The device of Clause 8, wherein individual ones of the plurality of sheet springs comprise: a respective first portion attached to the moveable platform; a respective second portion attached to the base structure; and a respective set of one or more flexure arms connecting the respective first portion to the respective second portion.

Clause 10: The device of Clause 9, wherein individual ones of the plurality of sheet springs further comprise: one or more bumper spring tabs extending from the respective first portion towards the second portion, wherein the one ore more bumper spring tabs are configured to cushion lateral movement of the moveable platform as the moveable platform approaches a stationary structure of the camera.

Clause 11: The device of any of Clauses 8-10, wherein: the moveable platform comprises a magnet holder; and the actuator comprises a voice coil motor (VCM) actuator that includes: one or more magnets attached to the magnet holder; and one or more coils attached to the base structure.

Clause 12: The device of any of Clauses 8-11, wherein the plurality of sheet springs comprises: a first sheet spring, comprising: a first portion attached to a first side of the moveable platform; a second portion attached to a first side of the base structure; and a first set of one or more flexure arms connecting the first portion of the first sheet spring to the second portion of the first sheet spring; and a second sheet spring, comprising: a first portion attached to a second side of the moveable platform that is opposite the first side of the moveable platform; a second portion attached to a second side of the base structure that is opposite the first side of the base structure; and a second set of one or more flexure arms connecting the first portion of the second sheet spring to the second portion of the second sheet spring.

Clause 13: The device of Clause 12, wherein: the first set of one or more flexure arms comprises: a first flexure arm proximate a first corner of the camera; and a second flexure arm proximate a second corner of the camera; the second set of one or more flexure arms comprises: a first flexure arm proximate a third corner of the camera; and a second flexure arm proximate a fourth corner of the camera.

Clause 14: The device of any of Clauses 8-14, wherein: the suspension arrangement comprises a first suspension arrangement; individual ones of the plurality of sheet springs extend along a respective plane that is parallel to the optical axis; the camera further comprises: a second suspension arrangement, comprising: a leaf spring suspending the lens group from the moveable platform and allowing the lens group to move, relative to the moveable platform, along the optical axis, the leaf spring extending along a plane that is orthogonal to the optical axis; and at least one of the sheet springs of the first suspension arrangement is electrically connected to the leaf spring of the second suspension arrangement, such that the camera is configured to convey electrical signals between the first suspension arrangement and the second suspension arrangement.

Clause 15: An optics system, comprising: a base structure; a moveable platform coupled to a lens group of a camera such that the moveable platform and the lens group are moveable together, relative to the base structure, in one or more directions orthogonal to an optical axis defined by one or more lenses of the lens group, wherein an actuator of the camera is to move the lens group relative to an image sensor of the camera; and a suspension arrangement comprising a plurality of sheet springs that suspend the moveable platform from the base structure and allow the lens group to move in the one or more directions orthogonal to the optical axis.

Clause 16: The optics system of Clause 15, wherein: the base structure defines a recess; individual ones of the plurality of sheet springs further comprise: a bumper spring tab extending from the respective first portion to at least partially within the recess, wherein the bumper spring tab is configured to cushion lateral movement of the moveable platform as the moveable platform as the moveable platform approaches a stationary structure of the camera.

Clause 17: The optics system of any of Clauses 15 or 16, wherein the moveable platform comprises a magnet holder too which one or more magnets of the actuator are attached.

Clause 18: The optics system of any of Clauses 15-17, wherein at least one of the plurality of sheet springs comprises a monolithic sheet spring.

Clause 19: The optics system of any of Clauses 15-18, wherein the plurality of sheet springs comprises: a first sheet spring, comprising: a first portion attached to a first side of the moveable platform; a second portion attached to a first side of the base structure; and a first set of one or more flexure arms connecting the first portion of the first sheet spring to the second portion of the first sheet spring; a second sheet spring, comprising: a first portion attached to a second side of the moveable platform that is opposite the first side of the moveable platform; a second portion attached to a second side of the base structure that is opposite the first side of the base structure; and a second set of one or more flexure arms connecting the first portion of the second sheet spring to the second portion of the second sheet spring; a third sheet spring, comprising: a first portion attached to a third side of the moveable platform; a second portion attached to a third side of the base structure; and a third set of one or more flexure arms connecting the first portion of the third sheet spring to the second portion of the third sheet spring; and a fourth sheet spring, comprising: a first portion attached to a fourth side of the moveable platform that is opposite the third side of the moveable platform; a second portion attached to a fourth side of the base structure that is opposite the third side of the base structure; and a fourth set of one or more flexure arms connecting the first portion of the fourth sheet spring to the second portion of the fourth sheet spring.

Clause 20: The optics system of Clause 19, wherein the first sheet spring is etched from a sheet of metal.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements that define an optical axis;
   an image sensor to capture light that has passed through the lens group;
   a base structure coupled with the image sensor;
   a moveable platform coupled with the lens group;
   an actuator to move the lens group together with the moveable platform in one or more directions orthogonal to the optical axis;
   a suspension arrangement comprising a plurality of sheet springs formed from a sheet material and that suspend the moveable platform from the base structure and allow the lens group to move in the one or more directions orthogonal to the optical axis; and
   a bumper spring tab formed from the sheet material and configured to cushion movement of the moveable platform orthogonal to the optical axis as the moveable platform approaches a stationary structure of the camera.

2. The camera of claim 1, wherein individual ones of the plurality of sheet springs comprise:
   a respective first portion attached to the moveable platform;
   a respective second portion attached to the base structure; and
   a respective set of one or more flexure arms connecting the respective first portion to the respective second portion.

3. The camera of claim 2, wherein:
   the base structure defines a recess;
   individual ones of the plurality of sheet springs further comprise:
      a respective bumper spring tab extending from the respective first portion to at least partially within the recess, wherein the bumper spring tab is configured to cushion lateral movement of the moveable platform as the moveable platform approaches a stationary structure of the camera.

4. The camera of claim 2, wherein for one sheet spring of the plurality of sheet springs:
   the first portion, the second portion, the set of one or more flexure arms, and the bumper spring tab are monolithic with respect to one another.

5. The camera of claim 1, wherein:
   the moveable platform comprises a magnet holder; and
   the actuator comprises one or more magnets attached to the magnet holder.

6. The camera of claim 1, wherein the plurality of sheet springs comprises:
   a first sheet spring extending along a first plane, comprising:
      a first portion attached to a first side of the moveable platform;
      a second portion attached to a first side of the base structure; and
      a first set of one or more flexure arms connecting the first portion of the first sheet spring to the second portion of the first sheet spring; and
   a second sheet spring extending along a second plane that is orthogonal to the first plane, comprising:
      a first portion attached to a second side of the moveable platform;
      a second portion attached to a second side of the base structure; and
      a second set of one or more flexure arms connecting the first portion of the second sheet spring to the second portion of the second sheet spring.

7. The camera of claim 1, wherein:
   the suspension arrangement comprises an optical image stabilization (OIS) suspension arrangement;
   individual ones of the plurality of sheet springs extend along a respective plane that is parallel to the optical axis; and the camera further comprises:
an autofocus (AF) suspension arrangement, comprising:
a leaf spring coupling the lens group to the moveable platform and allowing the lens group to move, relative to the moveable platform, along the optical axis;
wherein the leaf spring extends along a plane that is orthogonal to the optical axis.

8. A device, comprising:
one or more processors;
memory storing program instructions executable by the one or more processors to control operation of a camera; and
the camera, comprising:
a lens group comprising one or more lens elements that define an optical axis;
an image sensor to capture light that has passed through the lens group;
a base structure coupled with the image sensor;
a moveable platform coupled with the lens group;
an actuator to move lens group together with the moveable platform in one or more directions orthogonal to the optical axis;
a suspension arrangement comprising a plurality of sheet springs formed from a sheet material that suspend the moveable platform from the base structure and allow the lens group to move in the one or more directions orthogonal to the optical axis; and
a bumper spring tab formed from the sheet material and configured to cushion movement of the moveable platform orthogonal to the optical axis as the moveable platform approaches a stationary structure of the camera.

9. The device of claim 8, wherein individual ones of the plurality of sheet springs comprise:
a respective first portion attached to the moveable platform;
a respective second portion attached to the base structure; and
a respective set of one or more flexure arms connecting the respective first portion to the respective second portion.

10. The device of claim 9, wherein individual ones of the plurality of sheets springs further comprise:
one or more respective bumper spring tabs extending from the respective first portion towards the second portion, wherein the one or more bumper spring tabs are configured to cushion lateral movement of the moveable platform as the moveable platform approaches a stationary structure of the camera.

11. The device of claim 10, wherein for one sheet spring of the plurality of sheet springs:
the first portion, the second portion, the set of one or more flexure arms, and the bumper spring tab are monolithic with respect to each other.

12. The device of claim 8, wherein:
the moveable platform comprises a magnet holder; and
the actuator comprises a voice coil motor (VCM) actuator that includes:
one or more magnets attached to the magnet holder; and
one or more coils attached to the base structure.

13. The device of claim 8, wherein the plurality of sheet springs comprises:
a first sheet spring, comprising:
a first portion attached to a first side of the moveable platform;
a second portion attached to a first side of the base structure; and
a first set of one or more flexure arms connecting the first portion of the first sheet spring to the second portion of the first sheet spring; and
a second sheet spring, comprising:
a first portion attached to a second side of the moveable platform that is opposite the first side of the moveable platform;
a second portion attached to a second side of the base structure that is opposite the first side of the base structure; and
a second set of one or more flexure arms connecting the first portion of the second sheet spring to the second portion of the second sheet spring.

14. The device of claim 13, wherein:
the first set of one or more flexure arms comprises:
a first flexure arm proximate a first corner of the camera; and
a second flexure arm proximate a second corner of the camera;
the second set of one or more flexure arms comprises:
a first flexure arm proximate a third corner of the camera; and
a second flexure arm proximate a fourth corner of the camera.

15. The device of claim 8, wherein:
the suspension arrangement comprises a first suspension arrangement;
individual ones of the plurality of sheet springs extend along a respective plane that is parallel to the optical axis;
the camera further comprises:
a second suspension arrangement, comprising:
a leaf spring suspending the lens group from the moveable platform and allowing the lens group to move, relative to the moveable platform, along the optical axis, the leaf spring extending along a plane that is orthogonal to the optical axis; and
at least one of the sheet springs of the first suspension arrangement is electrically connected to the leaf spring of the second suspension arrangement, such that the camera is configured to convey electrical signals between the first suspension arrangement and the second suspension arrangement.

16. An optics system, comprising:
a base structure;
a moveable platform coupled to a lens group of a camera such that the moveable platform and the lens group are moveable together, relative to the base structure, in one or more directions orthogonal to an optical axis defined by one or more lenses of the lens group, wherein an actuator of the camera is to move the lens group relative to an image sensor of the camera;
a suspension arrangement comprising a plurality of sheet springs formed from a sheet material that suspend the moveable platform from the base structure and allow the lens group to move in the one or more directions orthogonal to the optical axis; and
a bumper spring tab formed from the sheet material and configured to cushion movement of the moveable platform orthogonal to the optical axis as the moveable platform approaches a stationary structure of the camera.

17. The optics system of claim 16, wherein:
the base structure defines a recess;
individual ones of the plurality of sheet springs further comprise:
- a respective bumper spring tab extending from the respective first portion to at least partially within the recess, wherein the respective bumper spring tab is configured to cushion lateral movement of the moveable platform as the moveable platform as the moveable platform approaches a stationary structure of the camera.

18. The optics system of claim 16, wherein:
the moveable platform comprises a magnet holder to which one or more magnets of the actuator are attached.

19. The optics system of claim 16, wherein the plurality of sheet springs comprises:
a first sheet spring, comprising:
- a first portion attached to a first side of the moveable platform;
- a second portion attached to a first side of the base structure; and
- a first set of one or more flexure arms connecting the first portion of the first sheet spring to the second portion of the first sheet spring;

a second sheet spring, comprising:
- a first portion attached to a second side of the moveable platform that is opposite the first side of the moveable platform;
- a second portion attached to a second side of the base structure that is opposite the first side of the base structure; and
- a second set of one or more flexure arms connecting the first portion of the second sheet spring to the second portion of the second sheet spring;

a third sheet spring, comprising:
- a first portion attached to a third side of the moveable platform;
- a second portion attached to a third side of the base structure; and
- a third set of one or more flexure arms connecting the first portion of the third sheet spring to the second portion of the third sheet spring; and a fourth sheet spring, comprising:
- a first portion attached to a fourth side of the moveable platform that is opposite the third side of the moveable platform;
- a second portion attached to a fourth side of the base structure that is opposite the third side of the base structure; and
- a fourth set of one or more flexure arms connecting the first portion of the fourth sheet spring to the second portion of the fourth sheet spring.

20. The optics system of claim 19, wherein for the first sheet spring:
the first portion, the second portion, the set of one or more flexure arms, and the bumper spring tab are monolithic with respect to one another.

* * * * *